US012504466B2

(12) United States Patent
Strickling et al.

(10) Patent No.: US 12,504,466 B2
(45) Date of Patent: Dec. 23, 2025

(54) AUTOMATED RECOGNITION OF A DEVICE UNDER TEST

(71) Applicant: Tektronix, Inc., Beaverton, OR (US)

(72) Inventors: Sam J. Strickling, Portland, OR (US); Andrew McCann, Beaverton, OR (US); Daniel S. Froelich, Portland, OR (US); Michelle L. Baldwin, Mount Juliet, TN (US); Jonathan San, Palo Alto, CA (US); Lin-Yung Chen, New Taipei (TW)

(73) Assignee: Tektronix, Inc., Beaverton, OR (US)

( * ) Notice: Subject to any disclaimer, the term of this patent is extended or adjusted under 35 U.S.C. 154(b) by 398 days.

(21) Appl. No.: 17/207,091

(22) Filed: Mar. 19, 2021

(65) Prior Publication Data
US 2021/0297882 A1 Sep. 23, 2021

Related U.S. Application Data

(60) Provisional application No. 63/060,021, filed on Aug. 1, 2020, provisional application No. 62/993,025, filed on Mar. 22, 2020.

(51) Int. Cl.
*G01R 31/28* (2006.01)
*G01R 35/00* (2006.01)
(Continued)

(52) U.S. Cl.
CPC ....... *G01R 31/2884* (2013.01); *G01R 35/005* (2013.01); *G06V 10/225* (2022.01);
(Continued)

(58) Field of Classification Search
CPC .. G01R 31/2884; G01R 35/005; G06V 10/75; G06V 20/80; G06V 10/225; H04W 24/08
See application file for complete search history.

(56) References Cited

U.S. PATENT DOCUMENTS 5,787,414 A * 7/1998 Miike ................. G06F 16/48
707/999.005
2009/0254788 A1* 10/2009 Cervantes ........ G11C 29/12015
714/733

(Continued)

FOREIGN PATENT DOCUMENTS

CN 103365938 10/2013
CN 107516137 12/2017
(Continued)

*Primary Examiner* — Abdeltif Ajid
(74) *Attorney, Agent, or Firm* — Miller Nash LLP; Andrew J. Harrington

(57) ABSTRACT

Systems and methods for automated recognition of a device under test and retrieving data associated with the device under test based on the recognition. The systems and methods include receiving a recognition key based on an identifying characteristic of the device under test, matching the received recognition key to a stored key in a database, retrieving data related to the stored key when the received recognition key matches the stored key, transmitting instructions to perform an action on a test and measurement device based on the retrieved data, receiving new data related to the device under test, and updating the data in the database related to the stored key with the new data.

18 Claims, 5 Drawing Sheets

(51) Int. Cl.
*G06V 10/22* (2022.01)
*G06V 10/75* (2022.01)
*G06V 20/80* (2022.01)
*H04W 24/08* (2009.01)

(52) U.S. Cl.
CPC .............. *G06V 10/75* (2022.01); *G06V 20/80* (2022.01); *H04W 24/08* (2013.01)

(56) References Cited

U.S. PATENT DOCUMENTS

| | | | | |
|---|---|---|---|---|
| 2009/0313347 | A1* | 12/2009 | Engel | G06F 15/16 709/212 |
| 2011/0267459 | A1* | 11/2011 | Choi | G06V 30/142 348/135 |
| 2013/0114882 | A1 | 5/2013 | Kawata | |
| 2013/0268416 | A1 | 10/2013 | Sandow | |
| 2014/0120981 | A1* | 5/2014 | King | G06F 16/58 455/556.1 |
| 2014/0270546 | A1* | 9/2014 | Neeley | G01D 7/02 382/218 |
| 2014/0320677 | A1* | 10/2014 | Jarvenpaa | G16H 30/40 382/128 |
| 2015/0051863 | A1* | 2/2015 | Tsuchida | G11C 29/56 702/123 |
| 2015/0095717 | A1* | 4/2015 | Frenz | G06F 11/2294 714/46 |
| 2017/0356956 | A1* | 12/2017 | Neeley | G01R 31/2834 |
| 2018/0356445 | A1* | 12/2018 | Vollum | G01R 13/029 |
| 2019/0312942 | A1* | 10/2019 | Benson | H04L 63/102 |
| 2020/0399928 | A1* | 12/2020 | Valecha | B29C 64/393 |

FOREIGN PATENT DOCUMENTS

| | | |
|---|---|---|
| JP | 2007115038 | 5/2007 |
| JP | 2013100996 | 5/2013 |
| JP | 2017044480 | 3/2017 |

* cited by examiner

US 12,504,466 B2

AUTOMATED RECOGNITION OF A DEVICE UNDER TEST

PRIORITY

This disclosure claims the benefit of U.S. Provisional Application No. 62/993,025, titled "AUTOMATED RECOGNITION OF A DEVICE UNDER TEST," filed on Mar. 22, 2020, and U.S. Provisional Application No. 63/060,021, titled "AUTOMATIC RECOGNITION OF SILICON IN A DEVICE UNDER TEST," filed on Aug. 1, 2020, which is incorporated herein by reference in its entirety.

TECHNICAL FIELD

This disclosure is directed to systems and methods related to test and measurement systems, and in particular, to automatically recognizing a device under test and organizing data related to the recognition of the device under test.

BACKGROUND

Engineers, and others, typically use a test and measurement instrument, such as an oscilloscope, to measure various signals and parameters of a device under test (DUT) to test, measure, troubleshoot, or otherwise characterize and/or validate the performance of the DUT. A user typically employs the test and measurement instrument to acquire measurement data, e.g. signal waveforms, at a large number of test points on the DUT. The user will often make multiple measurements, i.e. acquire data, multiple times for a single test point, for example, if the user is measuring an output signal of the DUT in response to varying parameters of an input signal.

Furthermore, in many cases, a user will need to test multiple instances or copies of a DUT design for a given project. For example, an engineer may have built ten prototypes of a particular printed circuit board assembly (PCBA) design for a project, and may need to perform the same sets of measurements on the same sets of test points on each of the ten DUTs, to compare the measured data, determine statistical properties of the data, determine operating performance margin of the project's designs, etc. As the number of test points, the number of tests to perform at each test point, and the number of DUTs increases, managing and organizing all of the measured data for a project can become challenging. In particular, there is a need for a user to be able to easily associate a set of measured data with a particular DUT and/or a group of DUTs that are part of a particular project. Measured data may include, for example, waveform data files, settings files, screenshots of the display of the test and measurement instrument, etc.

Conventionally, a user may associate measured data with a DUT by saving the data using a particular naming scheme. However, such a file naming scheme must be remembered and rigorously adhered to by all users working on a shared project, or data may be lost or misplaced.

Examples of the disclosure address these and other deficiencies of the prior art.

BRIEF DESCRIPTION OF THE DRAWINGS

Aspects, features and advantages of examples of the present disclosure will become apparent from the following description of examples in reference to the appended drawings in which.

DESCRIPTION

Figure 1:
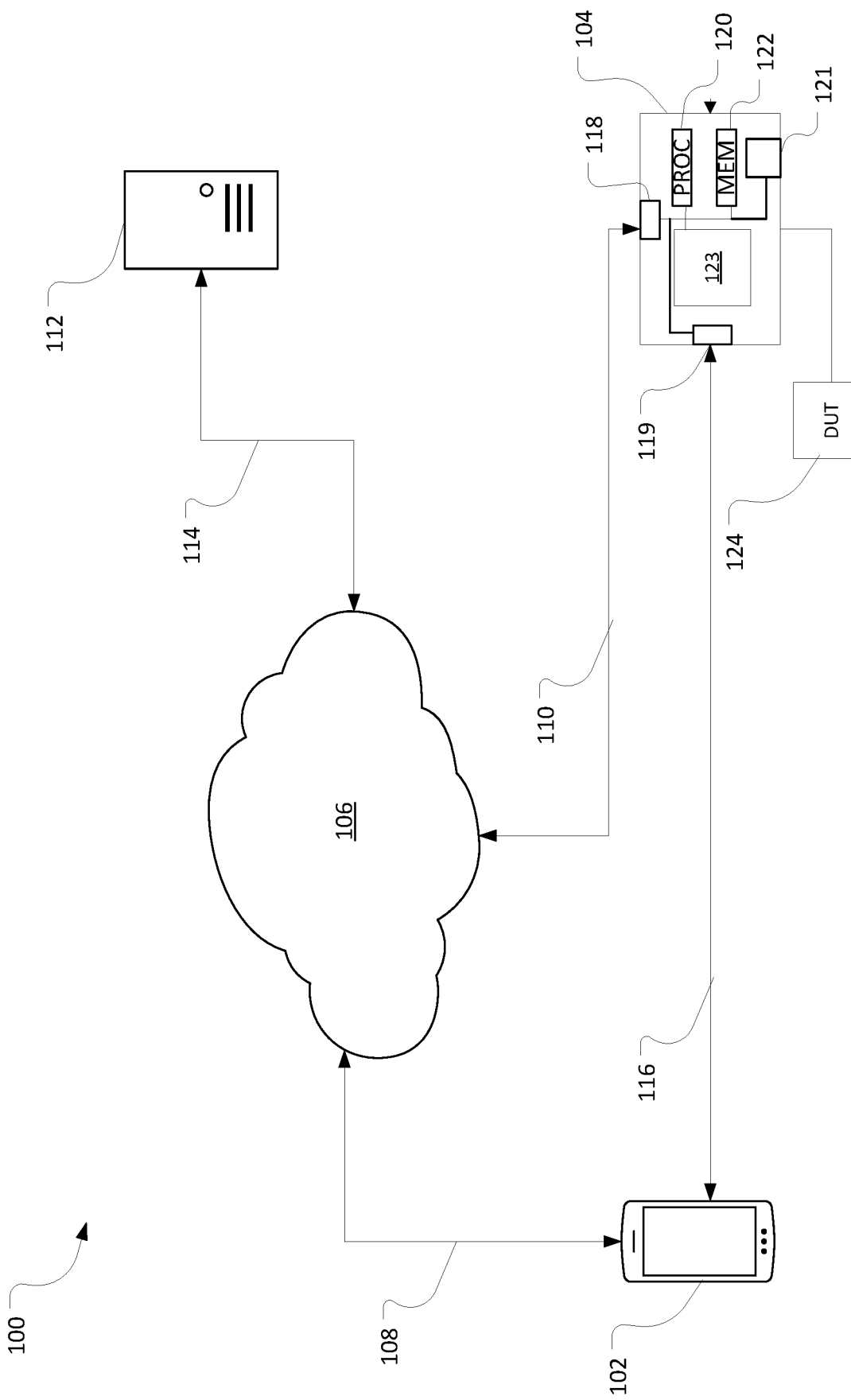
FIG. 1 illustrates an example of a test and measurement system according to some examples of the disclosure.

As mentioned above, users typically use a test and measurement instrument, such as an oscilloscope, to measure various signals and parameters of a DUT to test, measure, troubleshoot, or otherwise characterize and/or validate the performance of the DUT. The DUT may be any type of device that employs electrical, optical, or other types of signals measurable by the test and measurement instrument, or has other physical parameters that are measurable by the test and measurement instrument. For example, the DUT may be a printed circuit board assembly (PCBA) that may include a variety of sub-parts such as the bare printed circuit board (PCB) with specific land patterns for components, specific patterns of conductive traces between component land patterns, and silkscreening or other printing of component names or reference numbers; discrete components such as resistors, capacitors, inductors, wires, etc.; jumpers, switches, etc.; connectors such as various types of input/output (I/O) connectors, memory sockets, etc.; processing components such as microprocessors, microcontrollers, field-programmable gate arrays (FPGAs), etc.; integrated circuits such as application specific integrated circuits (ASICs), programmable logic devices (PLDs), etc.; memory devices such as flash memory, random access memory (RAM) modules, etc.; power management devices such as power supplies, power converters, filters, etc.; heatsinks; input devices; displays, light emitting diodes (LEDs), or other indicators; and various other components in a multitude of different form factors.

Many of the components of the DUT provide test points for the test and measurement instrument to measure a signal or a parameter of the DUT. For example, the test and measurement instrument may be coupled to a particular pin of a particular ASIC, or a particular ball if the ASIC is packaged as a ball grid array (BGA), to monitor and measure the electrical signal at that test point. The test and measurement instrument is typically coupled to the DUT using a test and measurement probe designed to physically contact the test point on the DUT.

A user typically employs the test and measurement instrument to acquire measurement data, e.g. signal waveforms, at a large number of test points on the DUT. The user will often make multiple measurements, i.e. acquire data, multiple times for a single test point, for example, if the user is measuring an output signal of the DUT in response to varying parameters of an input signal. Furthermore, in many cases, a user will need to test multiple instances or copies of a DUT design for a given project. For example, an engineer may have built a number of prototypes of a particular PCBA design for a project, and may need to perform the same sets of measurements on the same sets of test points on each of the ten DUTs, to compare the measured data, determine statistical properties of the data, determine operating performance margin of the project's designs, etc. Sometimes during these tests, or at other points of using the DUTs, components of the DUT may also have or require updates which can affect the performance of the DUT. As the number of test points, the number of tests to perform at each test point, and the number of DUTs increases, managing and organizing all of the measured data for a project can become challenging. In particular, there is a need for a user to be able to easily associate a set of measured data with a particular DUT and/or a group of DUTs that are part of a particular project. Measured data may include, for example, waveform data files, settings files, screenshots of the display of the test and measurement instrument, etc.

Conventionally, a user may associate measured data with a DUT by saving the data using a particular naming scheme. Most test and measurement instruments include an internal hard disk drive or other storage device, or are able to interface with an external storage device, such as a USB flash drive, or cloud-based storage. Typically, a user gives the DUT a name, e.g. "prototypedevice1A," and then saves the measured data to storage using file names or folder structures reflecting the DUT name, e.g. "C:\prototype_data\prototypedevice1A\testdata1.wfm." However, such a file naming scheme must be remembered and rigorously adhered to by all users working on a shared project, or data may be lost or misplaced. Furthermore, adhering to such a naming scheme becomes exponentially more difficult in an organizational environment where the test and measurement instrument may be shared between multiple users working on multiple different projects and/or types of DUTs, shared between multiple labs in the organization, measurement data from the DUT may be acquired in multiple physical locations, where there may be different primary languages spoken by different users of the instrument, etc. Some organizations attempt to maintain inventory tracking systems for their DUTs, but these systems require manual updating and maintenance, and are prone to error.

Examples of the disclosed technology address these problems, and others, by providing techniques to automatically create a unique identifier, or recognition key, for a DUT and to associate data related to the DUT with the unique identifier. In particular, examples of the disclosed technology may include a system that automatically determines a DUT's identity, or recognition key, based on its physical characteristics, including the layout of the board, a printed code on the board, or text on the board. In other examples, the DUT may include a unique electrical code for identification. Other aspects of the disclosure provide ways to link all of the measured data for that DUT to that recognition key, including techniques to quickly and easily retrieve all measured data for a particular DUT. For example, a user may easily retrieve all waveform data, session data, setup data, etc., from one or more test and measurement instruments, related to that particular DUT recognition key. U.S. patent application Ser. No. 16/695,980, filed Nov. 26, 2019, entitled "SYSTEM FOR TEST AND MEASUREMENT INSTRUMENTATION DATA COLLECTION AND EXCHANGE," the contents of which are hereby incorporated by reference in their entirety, describes systems and methods for collecting and aggregating data related to a DUT. In some examples of the present disclosure, the generated recognition key may be used as an input to those systems and methods.

The following discussion will use several terms to encompass various topics. The term "communications device" means a device, such as a smartphone, tablets, computing devices with cameras or other imaging sensors, or future devices that may take the place of smartphones, which may include a stand-alone digital camera, a circuit camera, microscope, thermal camera, or other imaging systems with network and/or other connections. The communications device has at least one communications link that allows the device to communicate with a test and measurement instrument, at least as far as sending a message to the instrument, and may use that same or other communications link to communicate with a remote server or storage. The communications device has a processor that executes code that enables it to communicate, a camera or other imaging sensor, an actuator to activate the camera/imaging sensor, and a memory.

The term "photograph" encompasses any picture or image, such as visual images, thermal images, or images resulting from 3D imaging, laser imaging detection and ranging (LIDAR) techniques, or from other techniques, such as spectrum techniques, captured by the camera or other sensors on the communications device, typically stored as a digital image file. These terms will be used interchangeably to refer to this captured image or photograph.

The term "instrument" as used here means a device that gathers data, either a test and measurement instrument, such as an oscilloscope, various kinds of meters, etc., or a sensor that gathers some sort of environmental data, such as temperature, wind speed, humidity, light intensity, sound levels, etc. These are just some examples and are in no way intended to limit the discussion to these particular examples.

The term "instrument data" means the data that the instrument has gathered and may include, but is not limited to: the instrument configuration and/or settings of any instrument involved in the set up; screen shots of the display of the instrument or instruments; the model and serial number of the instrument or instruments; a particular test or a particular step of a test that the instrument is performing on a device under test; the structured waveform applied to, or acquired from, the device under test; and the state of the instrument such as the CPU load, instrument set up information, enabled software licenses on the instrument, any other state-based information. In the case of a measurement instrument, the information may include connections between the instrument and any other devices, such as other measurement instruments; and measurement data files.

In the embodiment where the instrument is a sensor, the instrument data may include the type of the sensor, its current state, the make and model of the sensor, time and/or date stamps of samples stored by the sensor of whatever parameter it is sensing, etc.

"User information" as used here will typically be gathered from the communications device. It may identify the user, provide information for a user account, such as an email account, a cloud account or other storage account, including user names and passwords. This allows the photograph, associated data, and instrument data, if separate, to be stored in that user's account.

FIG. 1 illustrates a block diagram of an example system 100 according to some examples of the disclosure. In the example system 100 of FIG. 1, a communications device 102 and an instrument 104 are connected through a network 106 by communications links 108 and 110, respectively. Communications link 110 may connect to the instrument 104 through a port 118. Communications links 108 and 110 may be wired or wireless connections. A server 112 may be a proprietary server owned by the entity that owns the instrument 104 and possibly the communication device 102, or may be a cloud server on which the entity has accounts. The server 112 can have a database or can access a database of stored data. The server 112 connects to the other devices through the network 106 by connection 114. In addition, the communications device 102 and the instrument 104 may have a communications link 116 through a port 119. Communications link 116 may be a wired or wireless connection. The instrument 104 may have a processor 120 and a memory 122, in addition to a display 123. The figure shows the communications link 116 as being bi-directional, but as discussed below, may actually be a one-way link between the communications device 102 and the instrument 104. The instrument 104 may have user interface 121 for receiving commands, selections, or other input from a user. Also, as shown the instrument 104 may be connected to a device under test (DUT) 124.

Figure 2:
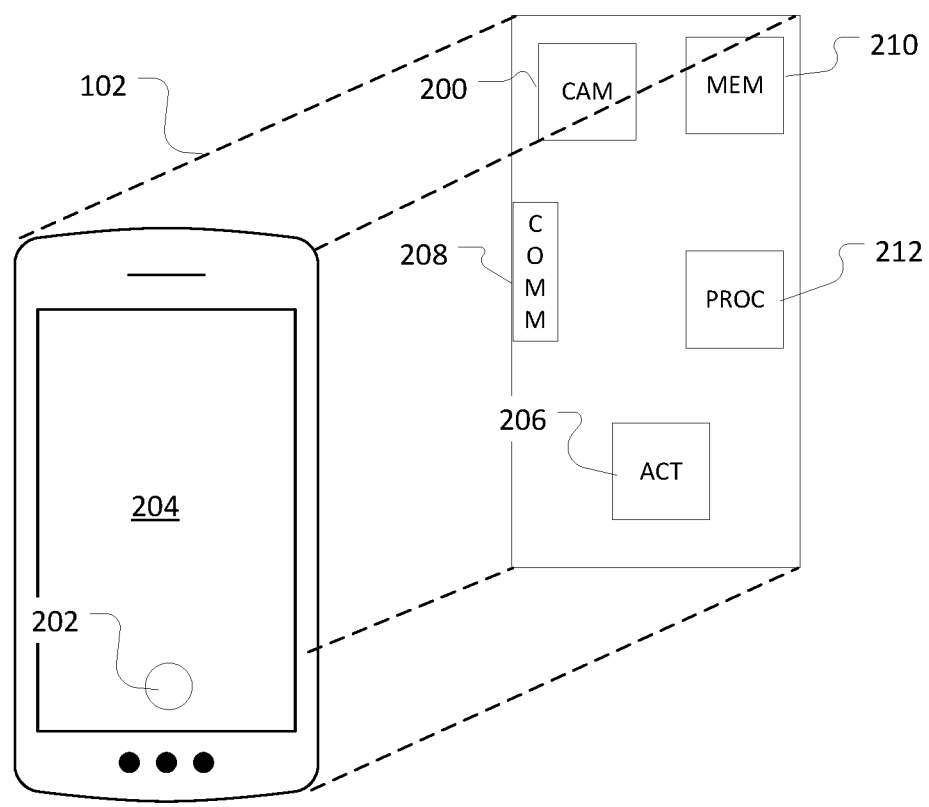
FIG. 2 illustrates an example of a communication device of FIG. 1.

As mentioned above, the communications device 102 may be what is commonly referred to as a smartphone, or whatever future embodiments of a smartphone entail. The communications device 102, however, is not limited to smartphones and may include any device that can take and transmit a photograph. FIG. 2 shows one embodiment of such as device 102. The device has a camera 200 that will take the photograph when the user activates the actuator. In current smartphones, for example, the actuator is an image of a button 202 on a user interface such as 204, which is typically a touch screen display. The activation of the actuator 206 may cause the device to send a message through communications interface 208, for example to the instrument 104. This will then result in a photograph that is stored in the memory 210, at least temporarily. A processor 212 controls these processes and may have a connection to the camera, the actuator, the memory, the communications interface and the user interface.

Examples of the disclosure can allow a user using a communications device 102 to take a photograph or image of a DUT, such as DUT 124 in FIG. 1, and either generate a recognition key based on the DUT 124 to associate with the DUT 124 and related records in a server 112 or determine a recognition key already exists and pull or gather records in the server 112 related to the DUT 124 for viewing and/or to provide instructions to the instrument 104.

The recognition key or identifier of the DUT 124 may be based on the physical characteristics of the DUT 124. In some examples, the recognition key may be, for example, a Quick Response (QR) code that is printed on a portion of the DUT 124. The communications device 102 may scan or otherwise take a photograph of the QR code and transmit the QR code to the server 112 as the recognition key. The recognition key may be, in some examples, based on the actual physical layout or configuration of the DUT 124 or based on text located on the DUT 124, determined from a photograph of the DUT 124. In other examples, the recognition key may also be an electrical pattern stored in a memory component of the DUT 124, such as a digital or analog electrical pattern that can be recognized by the server 112. As another example, the recognition key may be a scanned-in design or documentation of the DUT 124. Further, in some examples, the recognition key may include two or more recognition keys, such as both a physical recognition of the DUT 124, as well as a QR code printed on an integrated circuit or other component on the DUT 124.

Figure 3:
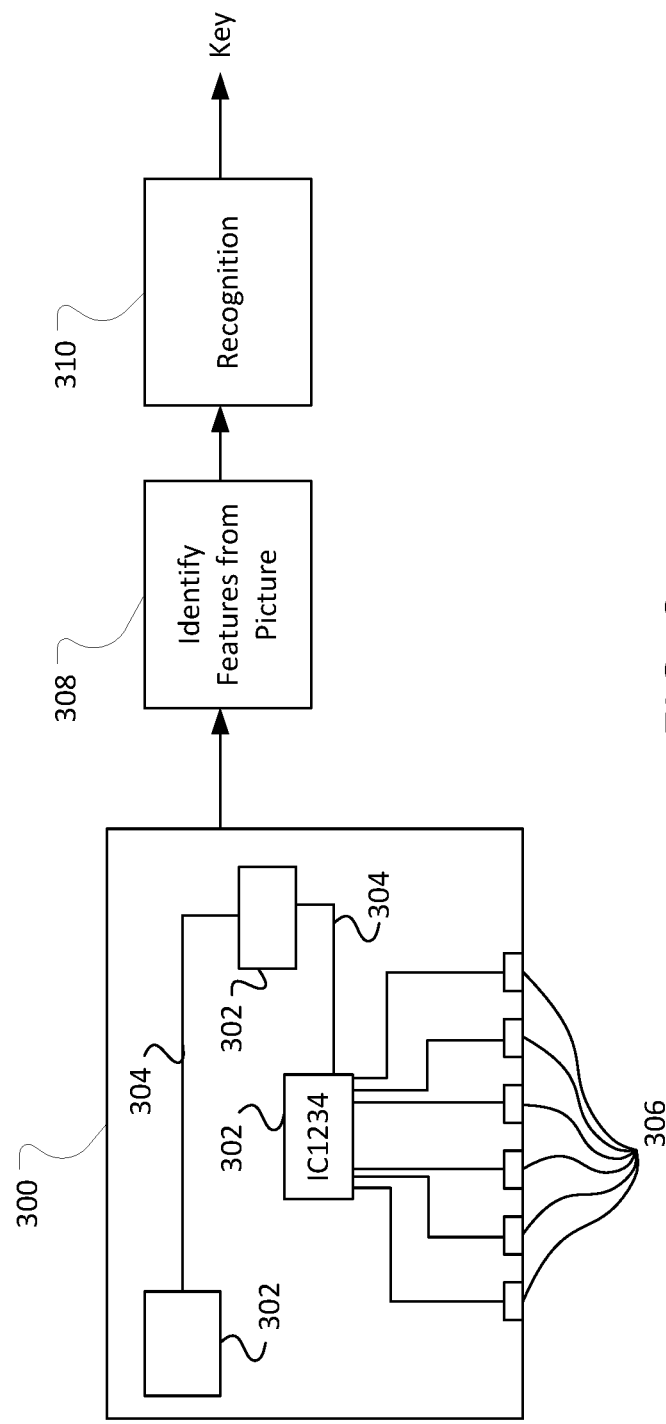
FIG. 3 is an example block diagram for generating a recognition key or identifier of a DUT according to some examples of the disclosure.

FIG. 3 illustrates a block diagram for generating or determining a recognition key based on physical characteristics of a DUT 124 by one or more processors of the system 100. As will be understood by one skilled in the art, multiple processors of the system 100 may perform different functions for generating the recognition key. A photograph 300 of DUT 124 is received. The photograph 300 shows the DUT 124 having a number of different components, including integrated chips 302, traces 304, and other components 306.

The photograph 300 is analyzed by one or more processors and the features of the DUT 124 from the photograph 300 are identified in operation 308. For example, the one or more processors may identify the dimensions of the DUT 124, integrated chips, heatsinks, traces, text on a printed circuit board or integrated chips, and connectors, such as a Bayonet Neill-Concelman (BNC), subminiature version A (SMA), square pin, etc., located on the DUT 124. During operation 308, specific types of components may be identified and later stored with the recognition key as well, such as specific types of capacitors, resistors, integrated chips, wires, etc., if it can be identified by the system when analyzing the photograph 300 of the DUT 124.

In operation 310, the final mapping and recognition of the physical characteristics of the DUT 124 is performed and the recognition key is generated. The recognition key may be generated using any known algorithms to determine the physical characteristics of the board, such as depth mapping or other topology mapping.

For example, most cameras within a smartphone have depth sensing application programming interfaces (APIs) that can be used to create a depth map of the DUT 124 based on the photograph. Creating the depth map may be done in a number of different ways. For example, using basic computer vision, the characteristics of the board can be identified. Using the physical features of the DUT 124, a two-dimensional map of the layout of the DUT 124 can be built and used as the recognition key.

As another example, using depth information from the camera of the communication device 102, a topology map of the DUT 124 can be created. Using the topology map, information can be extracted about the topology map and used as the recognition key. As yet another example, combinations of both the two-dimensional map and the topology map may be used to identify distinct components of the DUT 124. A three-dimensional positioning of the DUT 124 can be identified and a graph can be created to combine the information, which can be stored as the recognition key.

That is, the physical characteristics of the DUT 124, such as size, shape, integrated chip placement, connectors, resistors, and other portions of the DUT 124 are identified visually to create a unique recognition key to that DUT 124. The recognition key can be a set of geometric features or any other analysis to show the relationships between the features. The recognition key may be generated using any known algorithms to determine the physical characteristics of the board, such as depth mapping or other topology mapping.

Figure 4:
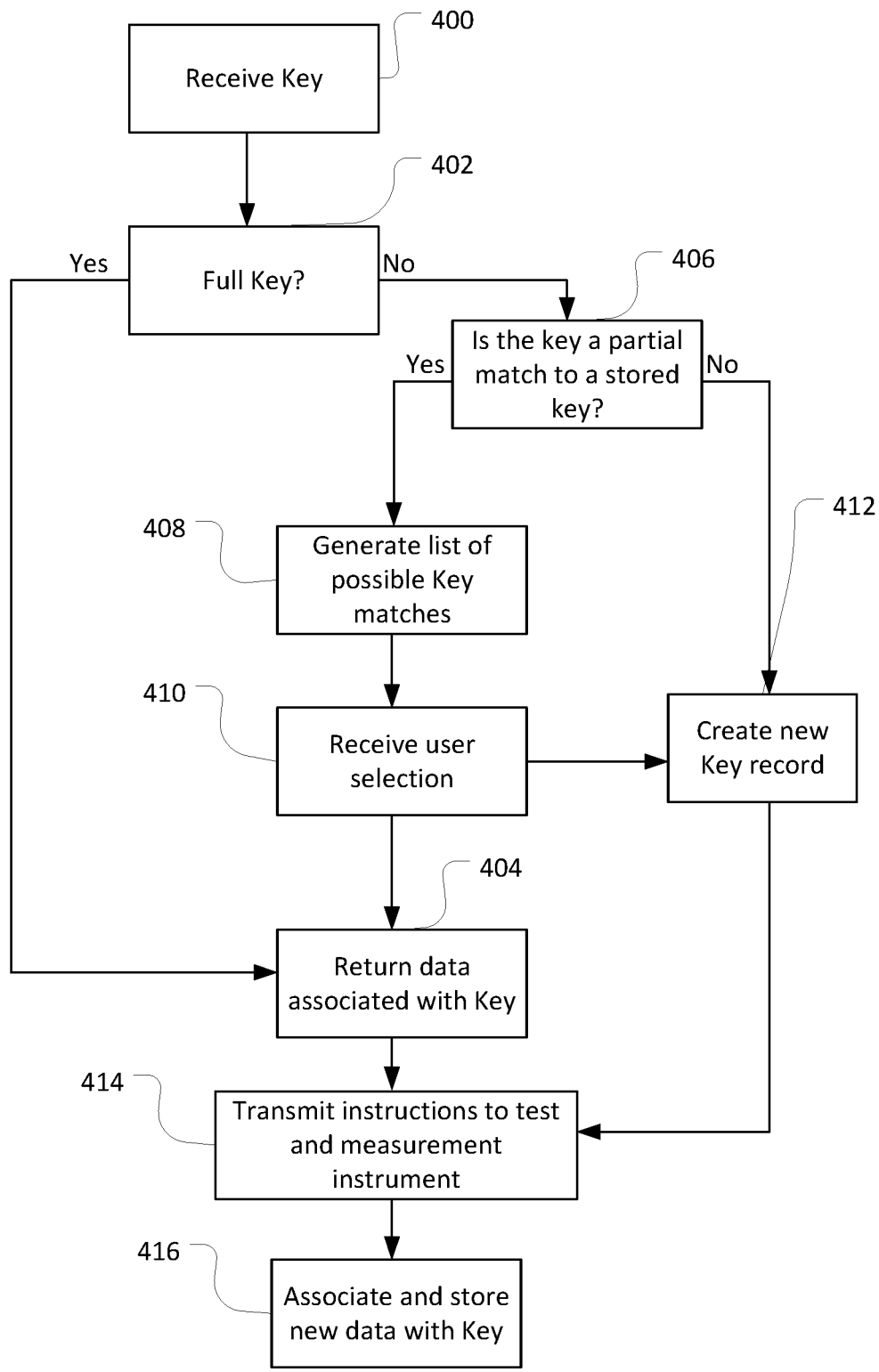
FIG. 4 is a flow chart illustrating an operation of the test and measurement system of FIG. 1.

FIG. 4 illustrates an example operation according to some examples of the disclosure. Initially, in operation 400, a recognition key or other identifier of a device under test is received at a processor, such as a processor of server 112. The recognition key may be generated as discussed above, or the recognition key may be sent as a unique electrical pattern or scanned documentation. The recognition key or identifier can be used to automatically recognize a DUT 124 and pull any information or records associated with the DUT 124 stored in the server 112.

Once the recognition key is received in operation 400, a processor can determine whether a full recognition key stored within the server 112 is present in operation 402. That is, the server 112 can determine whether the received recognition key directly matches a recognition key stored within the server 112. As mentioned above, the recognition key may be generated or determined using any processor within the system 100, such as a processor within the communication device 102, the cloud network 106, the server 112, etc.

If the received recognition key is an identical match to one stored in the server 112, then in operation 404, the server 112 can retrieve all of the data, or a subset of the data, that is stored with the recognition key, including past test results, users who performed tests on the device under test 124, settings of the instrument 104, etc. The data may be sent back to the communication device 102, or may be sent to the instrument 104 for either display or to configure the settings of the instrument 104.

If the recognition key is not an identical match to any of the recognition keys stored in the server 112, then the processor can determine if the recognition key is a partial match to a stored recognition key in the server 112 in operation 406.

There are a number of situations that could result in a recognition key not being an identical match to those stored in the server 112, yet nevertheless is associated with an actual recognition key already in the server 112. For example, if the recognition key is generated based on physical characteristics of a DUT 124, during storage or movement of the DUT 124 from one location to another, a component of the DUT 124 may have moved, resulting in the physical recognition key being slightly off. Further, a recognition key printed on the DUT 124 may have been partially removed or covered by some other component.

If the recognition key is a partial match to a recognition key on the server 112 in operation 406, then a list of the partial or possible recognition key matches are generated in operation 408. This generated list can be transmitted to the communication device 102 or to a display of the instrument 104. In operation 410, a user selection is received to either select the recognition key, in which case the next operation 404 is performed, or create a new recognition key record, in which case operation 412 is performed. If a recognition key is selected by the user in operation 410, then the data associated with the recognition key is returned in operation 404, as discussed above.

In some examples, operation 410 may also include updating the recognition key based on the partial match. That is, the recognition key selected by the user may be replaced with the partial match key or, alternatively, both the original recognition key and the partial match recognition key may be stored and associated with the data, resulting in the data having two recognition keys associated with it. In some examples, a user can indicate during operation 410 that this is a new DUT 124 and the process moves to operation 412 to create a new record for the recognition key. In that same regard, if it is determined that there is no matching recognition key in operation 406, the process moves to operation 412.

In operation 412, a record is generated and associated with the recognition key to associate with any data related to the DUT 124. As mentioned above, the recognition key may be any identifier that is associated with the DUT 124, such as, but not limited to, physical characteristics of the DUT 124 based on a picture, a QR code, text on the DUT 124, or scanned in documentation.

The system 100 may store multiple types of recognition keys within the system, and the type of recognition key may be automatically recognized based on the format of the recognition key. For example, a user may take a picture of the DUT 124 with the communication device 102 and the picture may be analyzed to see if a QR code is present, if there is text on the DUT 124, and also create a two-dimensional or three-dimensional rendering of the DUT 124.

Once a recognition key has been generated in operation 412 or data associated with a known recognition key has been returned in operation 404, instructions can be transmitted to the instrument 104 to perform an action in operation 414 based on the returned data. The data associated with the key may also be sent to the instrument 104. The action may be, for example, displaying the data associated with the key on a display 123. Additionally or alternatively, the action may also be for the instrument 104 to generate and output a message to a user, the message being visual on the display 123 or aurally by a speaker. Additionally or alternatively, the action may include automatically modifying or configuring settings of the test and measurement instrument based on data stored with the recognition key.

In operation 416, any additional data obtained by the instrument 104 based on the DUT 124 can be received and associated with the recognition key or keys, if multiple recognition keys are used, of the DUT 124 and stored in the server 112.

Figure 5:
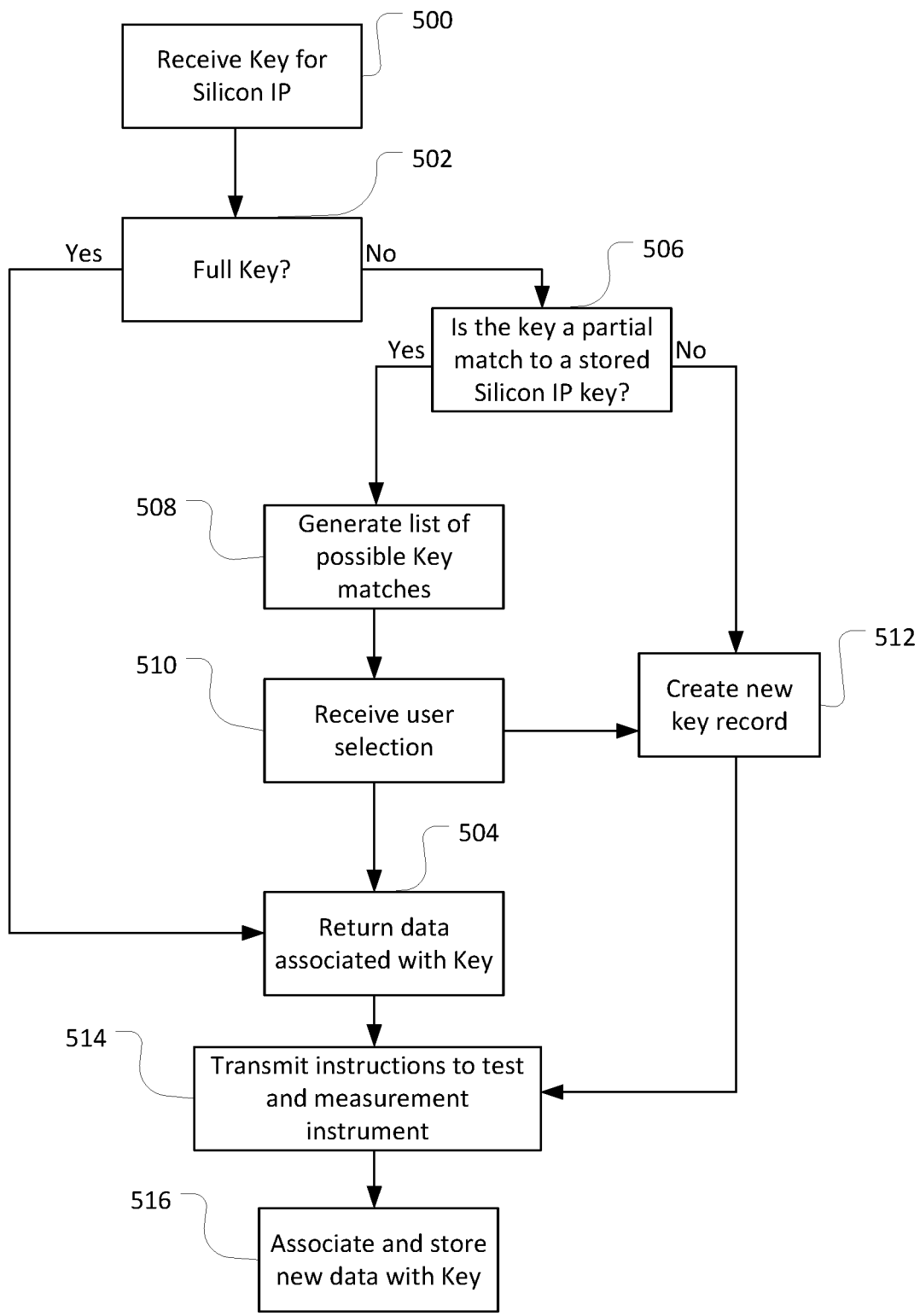
FIG. 5 is another flow chart illustrating another operation of the test and measurement system of FIG. 1.

FIG. 5 illustrates a flow chart of a specific implementation of examples of the disclosure for recognizing particular silicon intellectual property (IP), sometimes referred to as semiconductor IP core. The silicon IP includes a recognition key or other identifier to identify the silicon IP. For example, as discussed above, the recognition key or identifier may be a QR code printed on the silicon, physical object recognition of the silicon IP, recognition of text on the silicon, a unique electrical pattern stored within the silicon IP, or scanned in designs or documentation of the silicon IP.

In operation 500, the recognition key or identifier is received at the server 112. In operation 502, the server 112 compares the received recognition key to known recognition keys within the server 112. If the recognition key is known and recognized, data related to the particular silicon IP can be retrieved from the server 112 in operation 504. This data may include, for example, configuration data for the instrument 104, information for the operator of the instrument 104, recommended scripts or updates associated with the particular silicon IP, or any historical data of that silicon, which can include the date produced and the batch number, for example.

Similar to operation 406 in FIG. 4, in operation 506, if the recognition key is only a partial match, then a list of possible recognition key matches can be generated in operation 508. A user can select the correct recognition key and associated device in a generated list in operation 510 and the data associated with the recognition key can be returned to the communication device 102 and/or the instrument 104 in operation 504, or the user can create a new record for the recognition key in operation 512.

Once the data associated with the recognition key has been returned in operation 504, instructions can be sent to the instrument 104 to perform an action in operation 514 based on the returned data. Similar to operation 414, the action may be, for example, displaying the data associated with the key on a display 123. Additionally or alternatively, the action may also be for the instrument 104 to generate and output a message to a user, the message being visual on the display 123 or aurally by a speaker. Additionally or alternatively, the action may include automatically configuring or modifying settings of the test and measurement instrument based on data stored with the recognition key. Any new data associated with the recognition key can then be stored with the recognition key in operation 516.

As mentioned above, a DUT 124 may be associated with multiple recognition keys in some examples. For example, there may be a first recognition key associated with the DUT 124 as a whole, which includes storing test data and instrument configuration data related to the DUT 124. However, particular components on the DUT 124 may also be associated with recognition keys. For example, a particular integrated chip on the DUT 124 may be associated with a second recognition key. As such, any data related to either the first or second associated recognition keys may be returned when data related to the DUT 124 is returned to the user. That data may include suggested test configurations for the instrument 104 or may include updates or recommendations of updates to perform with the particular integrated chip.

The operations performed in FIGS. 4 and 5 discussed above may be performed at the server 112, or they may be performed within a cloud network, such as network 106. Additionally, the generation of the recognition key may be performed locally on the communication device 102 using a processor on the communication device 102, or the communication device 102 may send a photograph to one or more processors on the network 106 and/or the server 112 to generate or recognize the recognition key related to the photograph of the DUT 124. In some examples, if the recognition key is an electrical pattern, the recognition key or electrical pattern may be sent directly to the server 112, through network 106, or may be sent through either one of the communication device 102 or the instrument 104.

As will be understood by one skilled in the art, the operations shown in FIGS. 4 and 5 may be separated. For example, in some examples, a user may indicate by the communication device 102 that a new DUT 124 is being set up and that a new recognition key record needs to be created. In such a case, the operation may begin at operations 412 and 512 where the new recognition key is stored and any new data is stored and associated with the recognition key in operations 412 and 512, respectively. Further, the operations in FIGS. 4 and 5 may be performed by any processor or more than one processor within the system 100.

In some examples, the database of information stored in the server 112 may be searched to locate all DUTs 124 that have a similar component. For example, if testing a particular DUT 124 has shown that a component is bad, and the component has been recognized during physical recognition of the board when generating the recognition key, the user may be able to search and locate all DUTs 124 that have that particular component based on the physical recognition of the DUT 124.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. A configuration of the technologies may include any one or more, and any combination of, the examples described below.

Example 1 a method for recognizing a device under test, comprising receiving a recognition key based on an identifying characteristic of the device under test; matching the received recognition key to a stored key in a database; retrieving data related to the stored key when the received recognition key matches the stored key; transmitting instructions to perform an action on a test and measurement device based on the retrieved data; receiving new data related to the device under test; and updating the data in the database related to the stored key with the new data.

Example 2 is the method of example 1, further comprising generating the recognition key based on a physical characteristic of the device under test.

Example 3 is the method of example 2, wherein generating the recognition key includes analyzing a photograph of the device under test and generating the recognition key based on the photograph of the device under test.

Example 4 is the method of example 3, wherein analyzing the photograph includes generating the recognition key based on the physical layout of the device under test.

Example 5 is the method of either one of examples 3 or 4, wherein analyzing the photograph includes recognizing text on the device under test.

Example 6 is the method of any one of claims 2-5, wherein generating the recognition key includes scanning a Quick Response code printed on the device under test.

Example 7 is the method of any one of examples 1-6, further comprising receiving the instructions to perform the action at the test and measurement instrument; and performing the action based on the received instructions.

Example 8 is the method of example 7, wherein the action includes modifying settings of the test and measurement instrument based on data stored with the recognition key.

Example 9 is the method of either one of examples 7 or 8, wherein the action includes generating a message to a user based on the data.

Example 10 is the method of any one of examples 1-9, further comprising receiving multiple recognition keys based on two or more identifying characteristics of the device under test; matching the received recognition keys to stored keys in a database; retrieving data related to the stored keys when the received recognition keys match the stored keys; transmitting instructions to perform an action on a test and measurement instrument based on the retrieved data; receiving new data related to the device under test; and updating the data in the database related to at least one of the stored keys with the new data.

Example 11 is a test and measurement system, comprising a database configured to store a plurality of recognition keys and data associated with the recognition keys; one or more processors configured to match a recognition key based on an identifying characteristic of a device under test to a stored key in a database, retrieve data in the database related to the stored key when the received recognition key matches the stored key, generate instructions to perform an action on a test and measurement instrument based on the retrieved data, receive new data related to the device under test, and update the data in the database related to the stored key with the new data; and a transmitter configured to transmit the instructions to perform the action on the test and measurement instrument.

Example 12 is the system of example 11, wherein the one or more processors are further configured to generate the recognition key based on a physical characteristic of the device under test.

Example 13 is the system of example 12, wherein generating the key includes analyzing a photograph of the device under test and generating the recognition key based on the photograph of the device under test.

Example 14 is the system of example 13, wherein analyzing the photograph includes generating the recognition key based on the physical layout of the device under test.

Example 15 is the system of either one of examples 13 or 14, wherein analyzing the photograph includes recognizing text on the device under test.

Example 16 is the system of any one of examples 12-15, wherein generating the recognition key includes scanning a Quick Response code printed on the device under test.

Example 17 is the system of any one of examples 11-16, further comprising a test and measurement instrument configured to receive the instructions to perform the action on the test and measurement instrument and to perform the action based on the received instructions.

Example 18 is the system of example 17, wherein the action includes modifying settings of the test and measurement instrument based on data stored with the recognition key.

Example 19 is the system of either one of examples 17 or 18, wherein the action includes generating a message to a user based on the data.

Example 20 is the system of any one of examples 11-19, wherein the one or more processors are further configured to match multiple received recognition keys based on a number of identifying characteristics of the device under test to stored keys in a database; retrieve data related to the stored keys when the received recognition keys match the stored keys; generate instructions to perform an action on a test and measurement instrument based on the retrieved data; receive new data related to the device under test; and update the data in the database related to at least one of the stored keys with the new data.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A method for recognizing a device under test, comprising:
    taking a photograph of the device under test with a portable device;
    generating a recognition key from a topology analysis of the photograph of the device under test that identifies physical characteristics of the device under test;
    matching the received recognition key to a stored key in a database to identify the device under test;
    in a test and measurement device separate from the portable device, retrieving data related to the stored key when the received recognition key matches the stored key;
    transmitting instructions to perform an action on the test and measurement device based on the retrieved data;
    in the test and measurement device, generating measurement data separate from the recognition key, the measurement data related to the identified device under test; and
    updating the data in the database related to the stored key with the new data.

2. The method of claim 1, in which the physical characteristics identified by the topology analysis include a size of the device under test and the shape of the device under test.

3. The method of claim 1, in which the physical characteristics identified by the topology analysis include placement of integrated chips, traces, resistors, connectors, and capacitors.

4. The method of claim 1, further comprising:
receiving the instructions to perform the action at the test and measurement instrument; and
performing the action based on the received instructions.

5. The method of claim 4, wherein the action includes modifying settings of the test and measurement instrument based on data stored with the recognition key.

6. The method of claim 4, wherein the action includes generating a message to a user based on the data.

7. A test and measurement system, comprising:
a database configured to store a plurality of recognition keys and data associated with the recognition keys;
a portable image-generating device operative to generate a photograph of a device under test; and
one or more processors configured to:
match a recognition key to a stored key in a database, the recognition key generated based on a topology analysis of the photograph of the device under test that identifies physical characteristics of the device under test,
retrieve data in the database related to the stored key when the received recognition key matches the stored key,
generate instructions to perform an action on a test and measurement instrument based on the retrieved data,
in the test and measurement instrument, generate measurement data related to the device under test, and
update the data in the database related to the stored key with the new data.

8. The test and measurement system of claim 7, in which the physical characteristics identified by the topology analysis include a size of the device under test and the shape of the device under test.

9. The test and measurement system of claim 7, in which the physical characteristics identified by the topology analysis include placement of integrated chips, traces, resistors, connectors, and capacitors.

10. The test and measurement system of claim 7, further comprising:
receiving the instructions to perform the action at the test and measurement instrument; and
performing the action based on the received instructions.

11. The test and measurement system of claim 10, wherein the action includes modifying settings of the test and measurement instrument based on data stored with the recognition key.

12. The test and measurement system of claim 10, wherein the action includes generating a message to a user based on the data.

13. A test and measurement system for generating measurement data from a device under test, the test and measurement system comprising:
a portable device having a camera, the portable device including one or more processors configured to:
take a photograph of the device under test with the camera,
perform a topology analysis of the photograph that identifies physical characteristics of the device under test,
generate a recognition key based on the topology analysis, and
match the recognition key to a stored key in a database to identify the device under test; and
a test and measurement device in communication with the portable device and the identified device under test, the test and measurement device including one or more processors configured to:
receive the recognition key from the portable device,
retrieve data related to the stored key when the received recognition key matches the stored key;
generate measurement data from the identified device under test; and
update the data in the database related to the stored key with the generated measurement data.

14. The test and measurement system according to claim 13 in which the physical characteristics identified by the topology analysis include a size of the device under test and the shape of the device under test.

15. The test and measurement system of claim 13, in which the physical characteristics identified by the topology analysis include placement of integrated chips, traces, resistors, connectors, and capacitors.

16. The test and measurement system of claim 13, in which the one or more processors of the test and measurement device are further configured to:
generate configuration data related to the identified device under test; and
update the data in the database related to the stored key with the generated configuration data.

17. The test and measurement system of claim 13, in which the one or more processors of the test and measurement device are further configured to, when the received recognition key does not match any stored key:
generate measurement data from the identified device under test; and
store the measurement data as original data in the database related to the stored key.

18. The test and measurement system of claim 17, in which the one or more processors of the test and measurement device are further configured to:
generate configuration data from the identified device under test; and
store the configuration data as original configuration data in the database related to the stored key.

* * * * *